US011360726B2

(12) United States Patent
Hotokeishi

(10) Patent No.: US 11,360,726 B2
(45) Date of Patent: Jun. 14, 2022

(54) PRINT MANAGEMENT APPARATUS CAPABLE OF ALLOCATING A SCHEDULE ITEM FOR STEP PROCESSING TO AN OPERATION PERIOD OF A PROCESS IN ACCORDANCE WITH A PRIORITY SCHEDULE COMMAND, PRINT MANAGEMENT SYSTEM, AND NON-TRANSITORY COMPUTER READABLE MEDIUM

(71) Applicant: FUJIFILM Business Innovation Corp., Tokyo (JP)

(72) Inventor: Kenichirou Hotokeishi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 372 days.

(21) Appl. No.: 16/352,848

(22) Filed: Mar. 14, 2019

(65) Prior Publication Data
US 2019/0377528 A1 Dec. 12, 2019

(30) Foreign Application Priority Data
Jun. 12, 2018 (JP) .............................. JP2018-111724

(51) Int. Cl.
*G06F 3/12* (2006.01)
(52) U.S. Cl.
CPC .......... *G06F 3/1263* (2013.01); *G06F 3/1204* (2013.01); *G06F 3/1259* (2013.01); *G06F 3/1286* (2013.01)
(58) Field of Classification Search
CPC .................................................... G06F 3/1263

USPC ....................................................... 358/1.15
See application file for complete search history.

(56) References Cited

U.S. PATENT DOCUMENTS

| 7,701,605 | B2 | 4/2010 | Miyata | |
|---|---|---|---|---|
| 8,610,909 | B2 | 12/2013 | Miyata | |
| 2005/0275863 | A1* | 12/2005 | Ota | G06F 3/126 358/1.13 |

(Continued)

FOREIGN PATENT DOCUMENTS

| JP | 2002063004 | 2/2002 |
|---|---|---|
| JP | 2006-244088 | 9/2006 |

OTHER PUBLICATIONS

"Office Action of Japan Counterpart Application", dated Apr. 19, 2022, with English translation thereof, p. 1-p. 6.

*Primary Examiner* — Jacky X Zheng
(74) *Attorney, Agent, or Firm* — JCIPRNET

(57) ABSTRACT

A print management apparatus includes an allocation unit, a schedule reception unit, and a command reception unit. The allocation unit allocates a schedule item for processing related to generation of a printed material to an operation period of a process for generating the printed material based on print information. The schedule reception unit receives a change of the allocated schedule item from an operator or receives an addition of a schedule item for processing related to the generation of the printed material from the operator. The command reception unit receives a command for prioritizing one of a new schedule item obtained as a result of the change or the addition and an existing schedule (Continued)

item as a command for processing to be performed when the new schedule item partially or entirely overlaps with the existing schedule item.

16 Claims, 13 Drawing Sheets

(56) References Cited

U.S. PATENT DOCUMENTS

2006/0197977 A1\* 9/2006 Miyata .................. G06F 3/1275
 358/1.15

\* cited by examiner

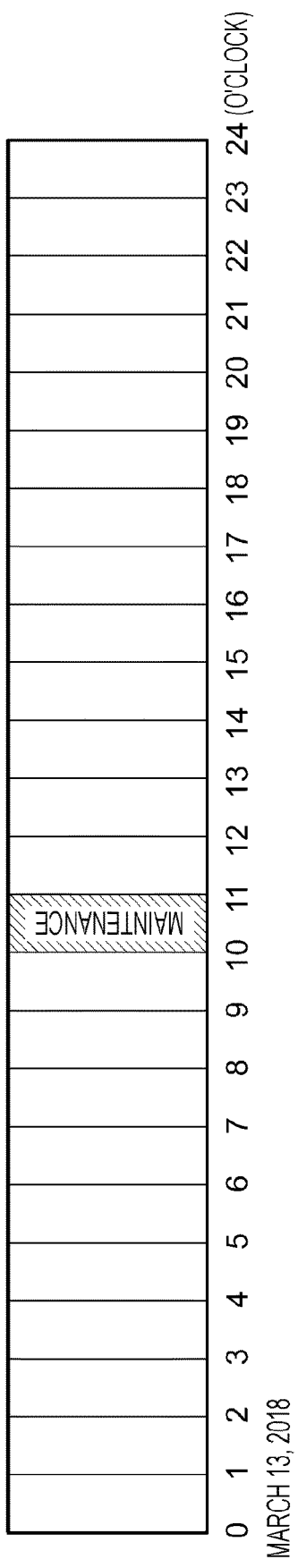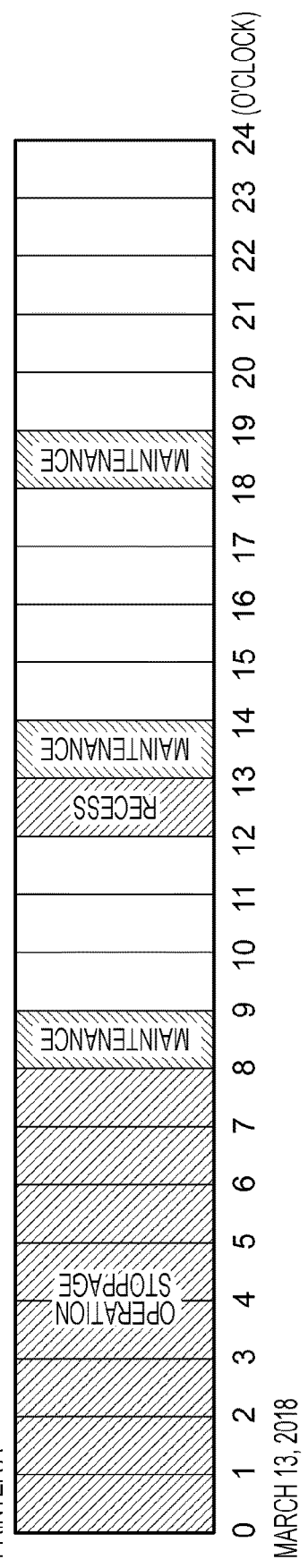

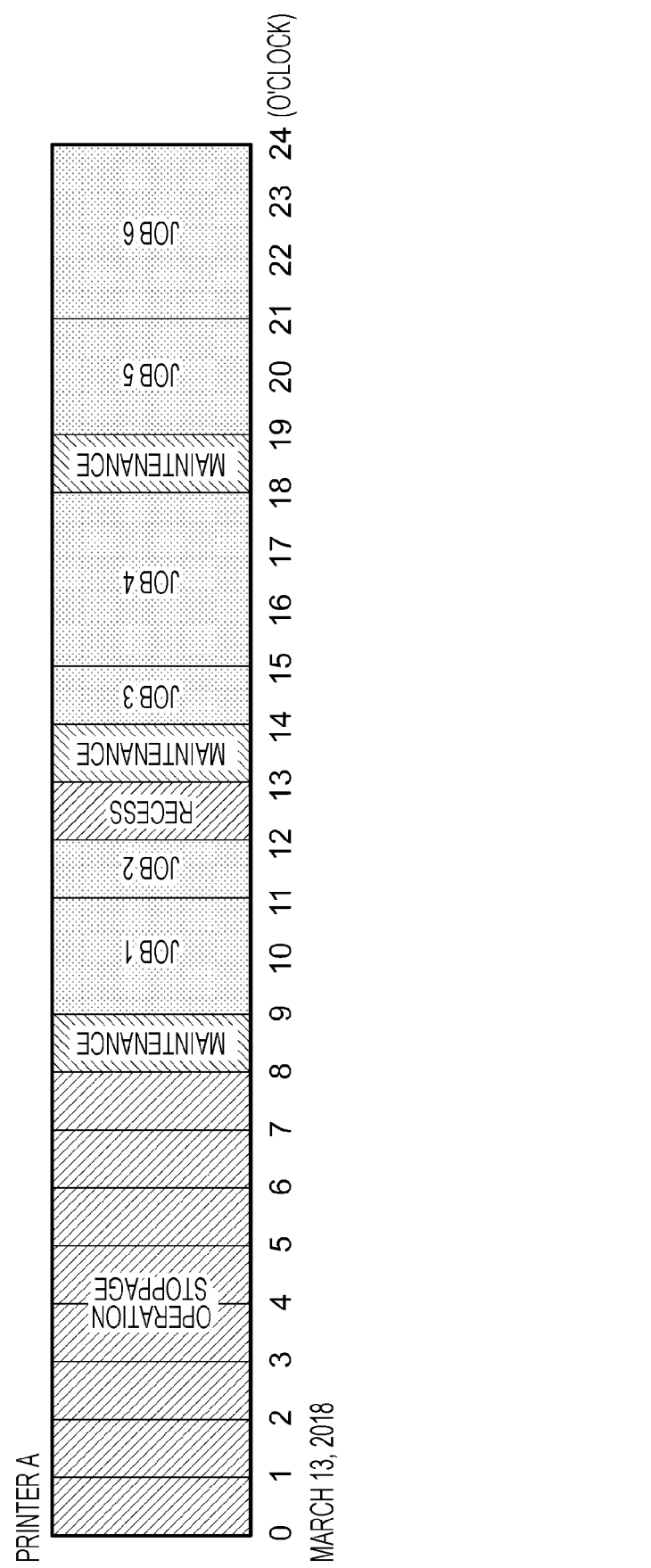

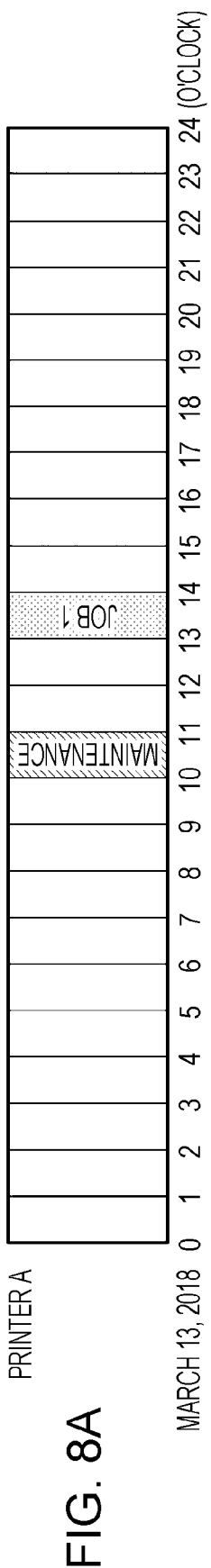
FIG. 8A
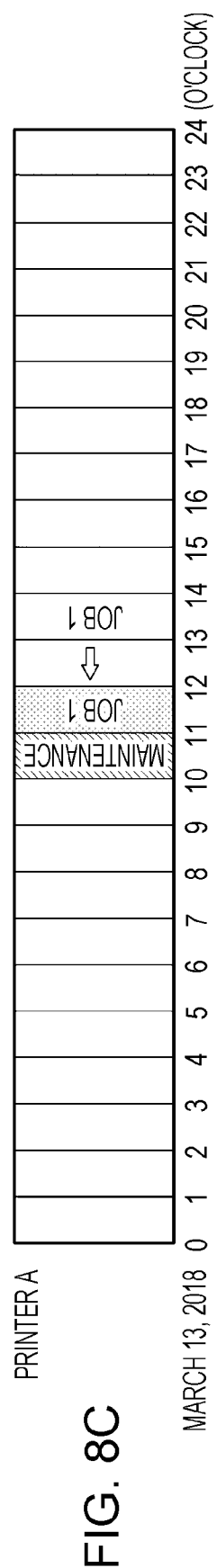
FIG. 8B
FIG. 8C

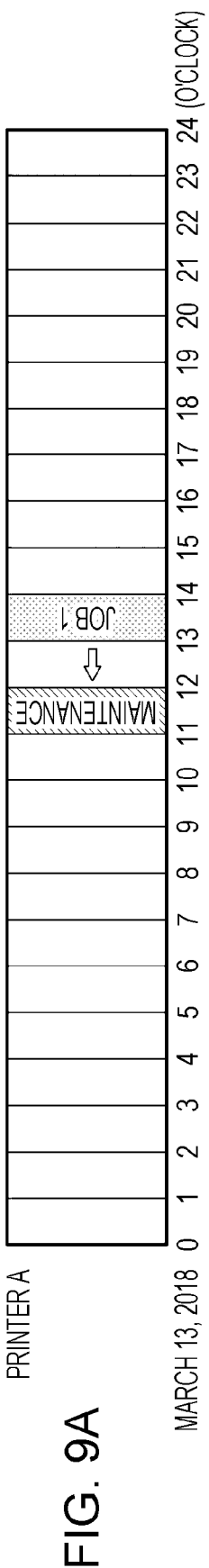
FIG. 9A
FIG. 9B
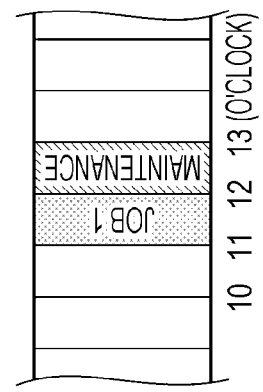
FIG. 9D
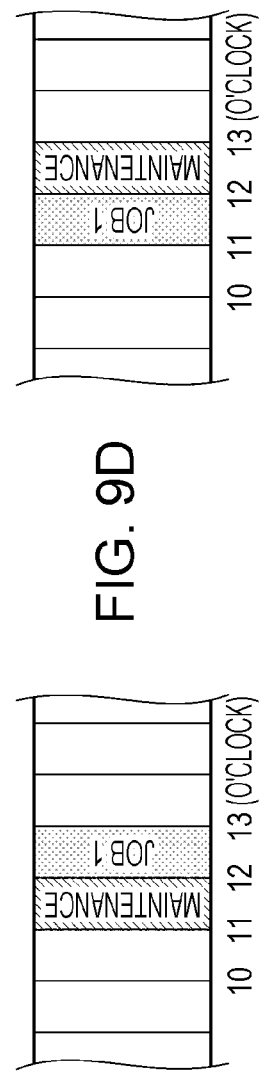
FIG. 9C

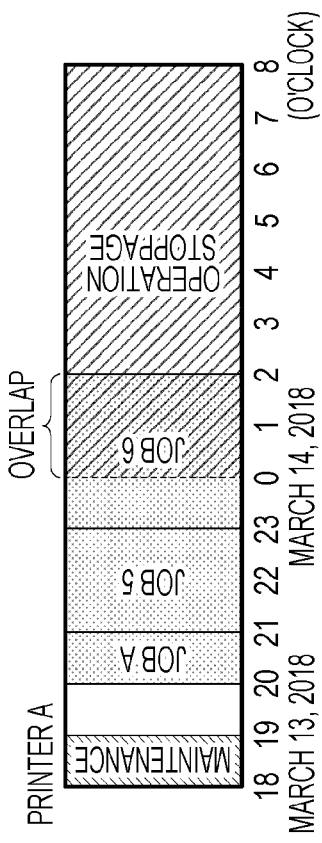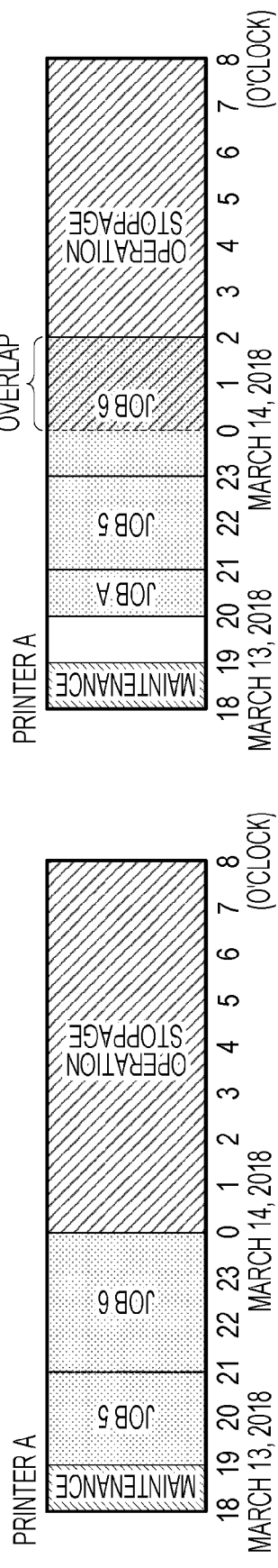

FIG. 11

| PRINT ||
| --- | --- |
| NON-ALLOCATED JOB | STATUS |
| JOB 6 | ADDITION OF JOB A |
| JOB 10 | ADDITION OF JOB B |
| JOB 11 | ADDITION OF JOB C |
| JOB 12 | ADDITION OF JOB D |
| JOB 13 | ADDITION OF JOB E |

PRINT MANAGEMENT APPARATUS CAPABLE OF ALLOCATING A SCHEDULE ITEM FOR STEP PROCESSING TO AN OPERATION PERIOD OF A PROCESS IN ACCORDANCE WITH A PRIORITY SCHEDULE COMMAND, PRINT MANAGEMENT SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-111724 filed Jun. 12, 2018.

BACKGROUND

(i) Technical Field

The present disclosure relates to print management apparatuses, print management systems, and non-transitory computer readable media.

(ii) Related Art

For example, Japanese Unexamined Patent Application Publication No. 2006-244088 discloses a technology for managing a print process. This technology involves analyzing an input print request, dividing the print request into a plurality of steps for carrying out the print request, setting a schedule item for each of the divided steps, grouping steps associated with each other in accordance with grouping attributes of the steps from among the divided steps obtained from the print request based on the grouping attributes, outputting the scheduled steps in an identifiable manner, and setting the schedule items of the steps such that the grouped steps are executable in a continuous time period.

SUMMARY

Sometimes, a schedule item of processing related to generation of a printed material is allocated to an operation period of a process for generating the printed material. If a new schedule item obtained as a result of a change or addition of the allocated schedule item partially or entirely overlaps with an existing schedule item, the determination of whether to prioritize the new schedule item or the existing schedule item varies depending on, for example, the deadline and the required time for the new schedule item.

Aspects of non-limiting embodiments of the present disclosure relate to easier management of processing related to generation of a printed material, as compared with a configuration that invariably prioritizes a new schedule item when the new schedule item partially or entirely overlaps with an existing schedule item.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a print management apparatus including an allocation unit, a schedule reception unit, and a command reception unit. The allocation unit allocates a schedule item for processing related to generation of a printed material to an operation period of a process for generating the printed material based on print information. The schedule reception unit receives a change of the allocated schedule item from an operator or receives an addition of a schedule item for processing related to the generation of the printed material from the operator. The command reception unit receives a command for prioritizing one of a new schedule item obtained as a result of the change or the addition and an existing schedule item as a command for processing to be performed when the new schedule item partially or entirely overlaps with the existing schedule item.

BRIEF DESCRIPTION OF THE DRAWINGS

Exemplary embodiments of the present disclosure will be described in detail based on the following figures, wherein:

FIGS. 5A and 5B illustrate examples of schedule items outside an operation period of a printing step;

FIG. 6 illustrates an example in which schedule items are allocated to the step operation period;

FIGS. 8A to 8C illustrate an example of an allocation process when the operator changes or adds a schedule item;

FIGS. 9A to 9D illustrate an example of an allocation process when the operator changes or adds a schedule item;

FIGS. 10A to 10D illustrate an example of an allocation process when the operator changes or adds a schedule item;

FIG. 11 illustrates an example of non-allocated jobs;

DETAILED DESCRIPTION

Exemplary embodiments of the present disclosure will be described in detail below with reference to the appended drawings.

Hardware Configuration of Print-Process Management Apparatus

Figure 1:
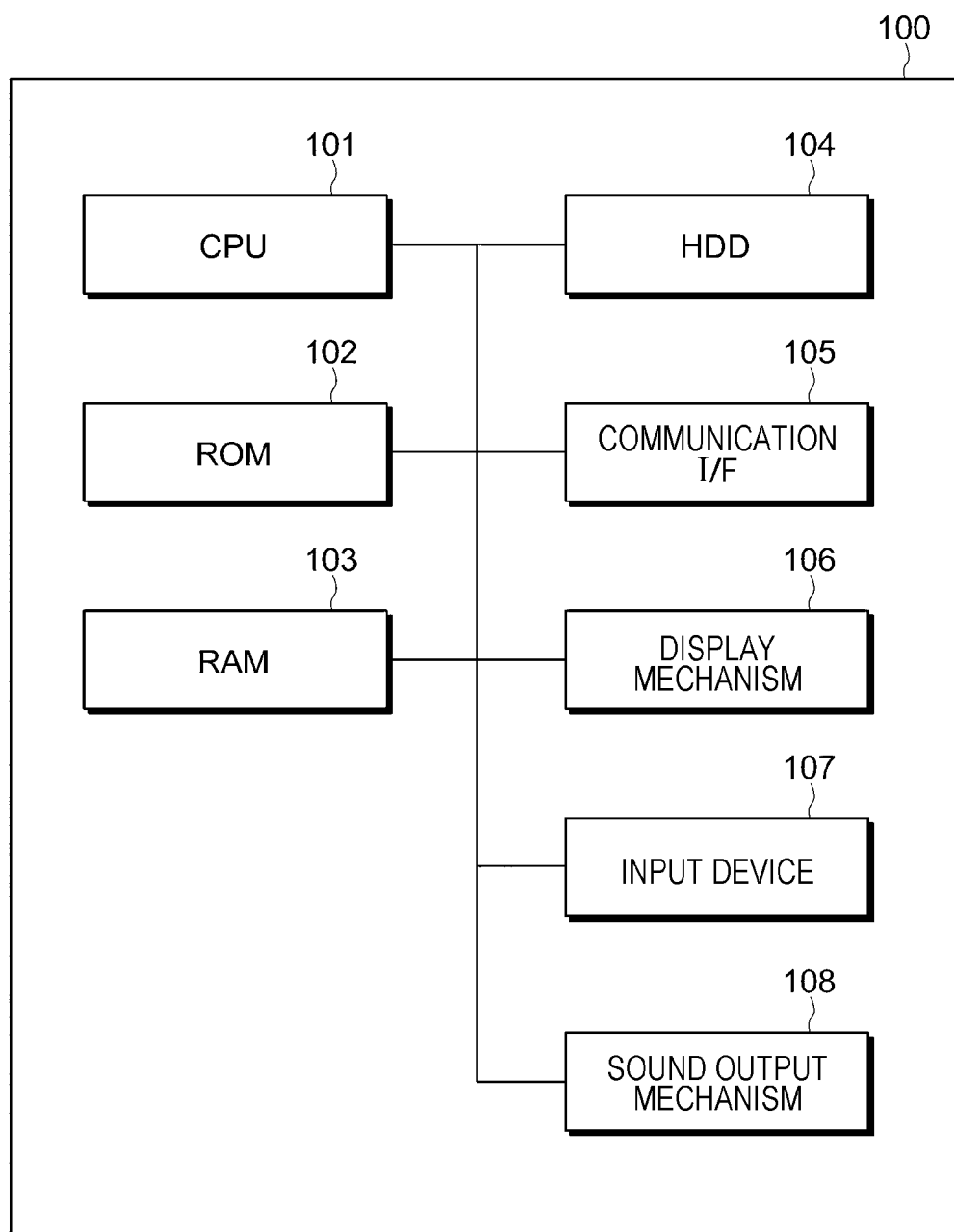
FIG. 1 illustrates a hardware configuration example of a print-process management apparatus according to an exemplary embodiment.

FIG. 1 illustrates a hardware configuration example of a print-process management apparatus 100 according to an exemplary embodiment. In this exemplary embodiment, the print-process management apparatus 100 is used as an example of a print management apparatus.

As shown in FIG. 1, the print-process management apparatus 100 according to this exemplary embodiment includes a central processing unit (CPU) 101 as arithmetic means, a read-only memory (ROM) 102 as a storage area that stores a program, such as a basic input output system (BIOS), and a random access memory (RAM) 103 as an area where a program is executed. Moreover, the print-process management apparatus 100 also includes a hard disk drive (HDD) 104 as a storage area that stores various types of programs, such as an operating system (OS) and applications, input data for the various types of programs, and output data from the various types of programs.

Furthermore, the print-process management apparatus 100 includes a communication interface (communication I/F) 105 for communicating with an external unit, a display mechanism 106, such as a display, an input device 107, such as a keyboard, mouse, and/or touchscreen, and a sound output mechanism 108, such as a loudspeaker, for outputting sound.

Functional Configuration of Print-Process Management Apparatus Next, a functional configuration of the print-process management apparatus 100 according to this exemplary embodiment will be described.

The print-process management apparatus 100 according to this exemplary embodiment manages a print process, that is, a process related to generation of a printed material based on a print job.

A print job includes image data to be printed and a control command in which settings in print processing are described, and is data serving as a unit of the print processing to be executed in a printer. In this exemplary embodiment, a print job is used as an example of print information.

Figure 2:
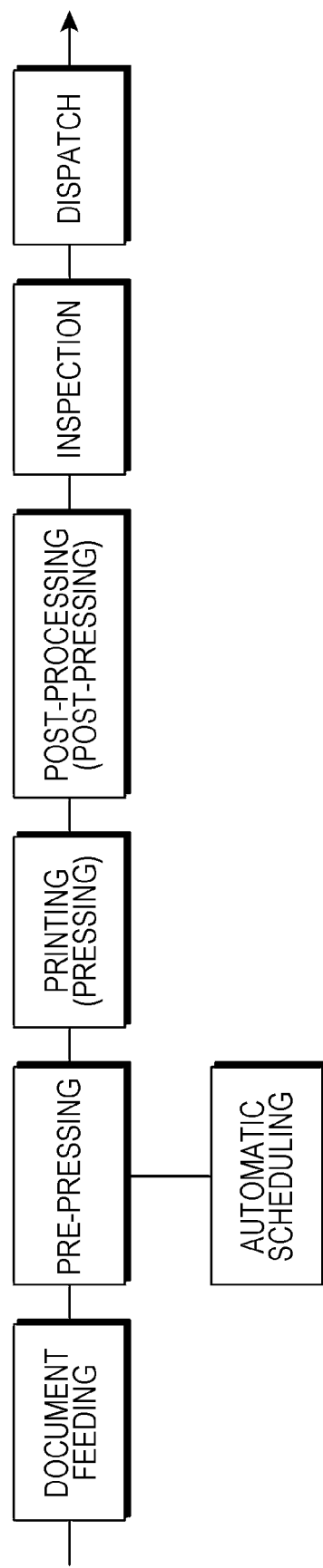
FIG. 2 illustrates an example of a print process.

FIG. 2 illustrates an example of the print process. As shown in FIG. 2, the print process includes, for example, a plurality of steps, such as a "document feeding" step, a "pre-pressing" step, a "printing (pressing)" step, a "post-processing (post-pressing)" step, an "inspection" step, and a "dispatch" step.

The "document feeding" step involves receiving print data provided from a client requesting the print process. The "pre-pressing" step is a step performed prior to the printing step and involves, for example, designing, editing, or planning the layout of an object to be printed based on the print data provided from the client. The print job is generated as a result of the pre-pressing step, such that the number of pages or copies to be printed and the paper to be used in the printing step are set. Therefore, with regard to each print job, the time to be taken for each of the printing step, the post-processing step, the inspection step, and the dispatch step, which are to be performed after the pre-pressing step, is predictable.

The "printing (pressing)" step involves actually performing printing by using the printer. The "post-processing (post-pressing)" step is to be performed after the printing step and involves performing post-processing, such as bookbinding or sheet cutting. The "inspection" step involves inspecting the post-processed contents. The "dispatch" step involves delivering the printed material after the inspection step to the client.

It is assumed that a single print job is divided into components of a printed material, such as "front cover", "text", and "book band", such that the printing (pressing) step is performed for each component or such that the post-processing (post-pressing) step is performed upon completion of printing of a plurality of components.

In the following description, each of the plurality of steps including the "document feeding" step, the "pre-pressing" step, the "printing (pressing)" step, the "post-processing (post-pressing)" step, the "inspection" step, and the "dispatch" step may simply be referred to as "step". Furthermore, the processing to be performed in each step, such as print processing and post-processing, may sometimes be referred to as "step processing". In other words, step processing may be regarded as processing related to generation of a printed material.

The steps constituting the above-described print process are sequentially performed in a response to a request from the client. However, since a print request normally has a set deadline, it is demanded that the steps be performed so as to meet the deadline. As shown in FIG. 2, when the pre-pressing step is to be performed, the print-process management apparatus 100 predicts the time that may be required for performing step processing in each of the steps following the pre-pressing step, thereby performing automatic scheduling.

This automatic scheduling involves planning the time and date of step processing to be executed in each of the steps following the pre-pressing step (i.e., the printing, post-processing, inspection, and dispatch steps). As will be described later, in automatic scheduling, the time and date of step processing is planned in view of, for example, an operation period of the printer or a post-processing device, a recess period of a worker, and an operation stoppage period in which equipment, such as the printer, is stopped upon completion of work. Moreover, if there is a change of schedule in step processing or if there is an addition to the schedule, automatic scheduling is performed. In that case, the time and date are adjusted in the overall print process.

Figure 3:
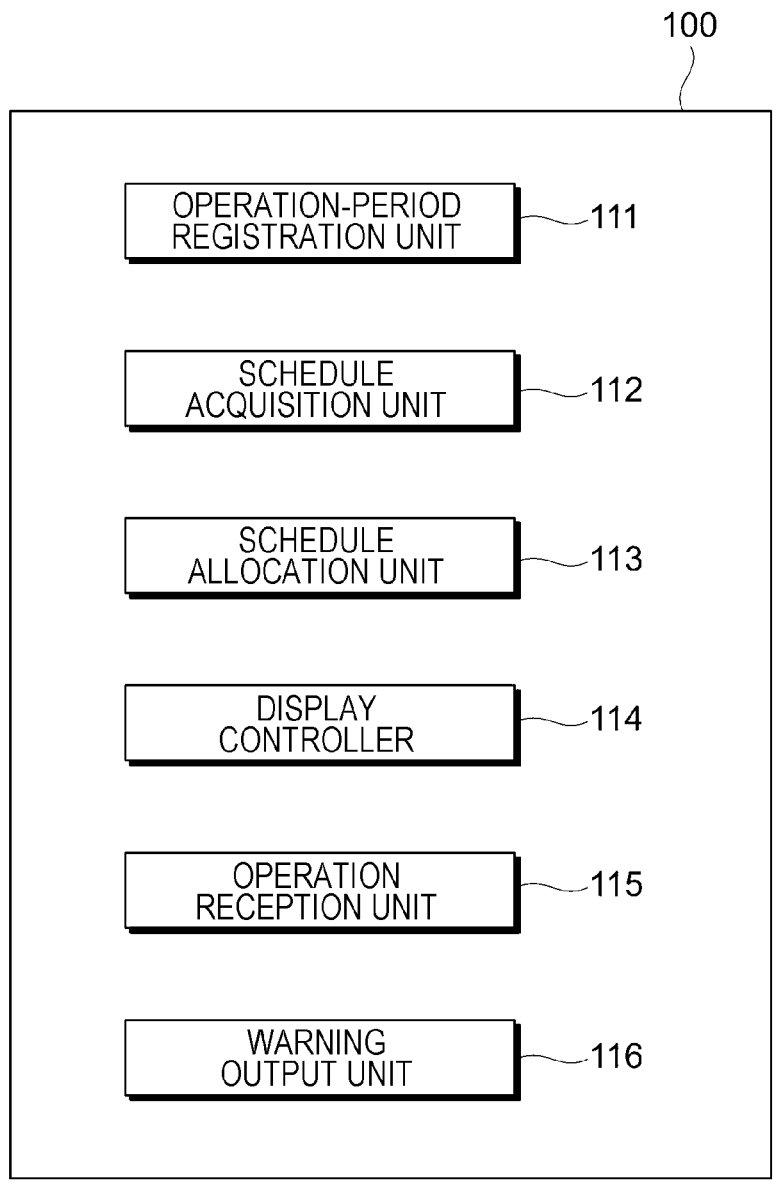
FIG. 3 is a block diagram illustrating a functional configuration example of the print-process management apparatus according to the exemplary embodiment.

FIG. 3 is a block diagram illustrating a functional configuration example of the print-process management apparatus 100 according to this exemplary embodiment. The print-process management apparatus 100 according to this exemplary embodiment includes an operation-period registration unit 111, a schedule acquisition unit 112, a schedule allocation unit 113, a display controller 114, an operation reception unit 115, and a warning output unit 116.

The operation-period registration unit 111 registers the operation period of each of the plurality of steps constituting the print process. The operation period is a period in which the step processing of the print process is executable.

For example, in the printing (pressing) step, a printer that performs print processing based on a print job is used. Therefore, the operation period of the printing step is the operation period of the printer and may be regarded as a period in which the printer is capable of executing print processing.

Specifically, for example, the operator sets a schedule item outside the operation period of the printer, such as a maintenance schedule item of the printer, an operation stoppage schedule item of the printer, and a recess period of a worker. In accordance with the set schedule item outside the operation period of the printer, the operation-period registration unit 111 registers the schedule item outside the operation period of the printer, as well as the remaining period as the operation period of the printer.

Furthermore, for example, in the post-processing step, a post-processing device that performs post-processing of the print processing is used. Therefore, the operation period of the post-processing step is the operation period of the post-processing device and may be regarded as a period in which the post-processing device is capable of executing post-processing.

Specifically, similar to the case of the printer, for example, the operator sets a schedule item outside the operation period of the post-processing device, such as a maintenance schedule item of the post-processing device, an operation stoppage schedule item of the post-processing device, and a recess period of a worker. In accordance with the set schedule item outside the operation period of the post-processing device, the operation-period registration unit 111 registers the schedule item outside the operation period of the post-processing device as well as the remaining period as the operation period of the post-processing device.

Furthermore, with regard to the inspection step and the dispatch step, the operation-period registration unit 111 registers the operation period of the inspection step and the operation period of the dispatch step. The inspection step and the dispatch step involve manual work by a worker. Therefore, for example, the operator sets the working period and the recess period of the worker. In accordance with these set periods, the operation-period registration unit 111 registers the schedule item outside the operation period in the inspection step as well as the operation period. Moreover, the operation-period registration unit 111 registers the schedule item outside the operation period in the dispatch step as well as the operation period.

In other words, the printer and the post-processing device are devices (referred to as "printed-material generating devices" hereinafter) to be used for generating a printed material based on a print job. Thus, in the printing step and the post-processing step, the operation-period registration unit 111 is configured to register the operation periods of the printed-material generating devices.

For example, it is conceivable that the inspection step may involve the use of an inspection device for inspecting the printed material and that the dispatch step may involve the use of a transport device, such as a truck. In the inspection step, the operation-period registration unit 111 may register a schedule item outside the operation period of the inspection device as well as the operation period of the inspection device. Moreover, in the dispatch step, the operation-period registration unit 111 may register a schedule item outside the operation period of the transport device as well as the operation period of the transport device. In this case, the inspection device and the transport device may be regarded as examples of printed-material generating devices.

The schedule acquisition unit 112 acquires a schedule item of step processing executed in each step of the print process. Specifically, for each print job generated in the pre-pressing step, the schedule acquisition unit 112 acquires a predicted scheduled period necessary for the step processing of each of the steps following the pre-pressing step (i.e., the printing, post-processing, inspection, and dispatch steps). In other words, for each print job generated in the pre-pressing step, the schedule acquisition unit 112 acquires a scheduled period of step processing to be executed in each of the printing, post-processing, inspection, and dispatch steps.

Furthermore, for each print job, the schedule acquisition unit 112 acquires a deadline for generating a printed material based on the print job. A deadline for a print job is, for example, a deadline for the dispatch step, which is the final step, and is normally set by the client requesting the print process.

A print process is sometimes performed by collectively treating a plurality of print jobs as a group job by focusing on the components constituting the printed material and the attributes of the print jobs. For example, it is conceivable that different print jobs may be grouped into a single group job if the paper used is of the same material and quality, or that different print jobs may be grouped into a single group job if the request is made by the same client. Moreover, in a case where a printed material constituted of components such as "front cover", "text", and "book band" is to be generated, it is conceivable that "front cover" components are grouped into a single group job, "text" components are grouped into a single group job, and "book band" components are grouped into a single group job. With regard to a deadline for a group job into which a plurality of print jobs are grouped in this manner, the schedule acquisition unit 112 acquires the most recent deadline (i.e., the earliest deadline) from among the deadlines for the plurality of print jobs.

The schedule allocation unit 113 as an example of allocation means allocates the schedule item of step processing to the operation period of each of the plurality of steps constituting the print process. The schedule allocation unit 113 allocates the schedule item of step processing to the operation period of each of the steps following the pre-pressing step. For example, in the printing step, the schedule allocation unit 113 allocates the schedule item for printing of each print job to the operation period of the printer.

The display controller 114 as an example of a display outputs data for causing a display, such as the display mechanism 106, to display a screen and controls the display.

For example, with regard to each of the plurality of steps constituting the print process, the display controller 114 displays the condition of the schedule item for step processing allocated to the operation period. Moreover, for example, in order to register the operation period of each step, the display controller 114 displays a screen for receiving a schedule item outside the step operation period. Furthermore, for example, the display controller 114 displays a screen for receiving a change or addition of a schedule item for step processing. Moreover, the display controller 114 displays a screen indicating a list of print jobs in which a schedule item for processing related to generation of a printed material based on a print job is not allocated to the operation period. These screens will be described later in detail.

The operation reception unit 115 as an example of schedule reception means and command reception means receives an operation from the operator. The operation reception unit 115 receives, for example, an operator's operation performed on a screen displayed on a display, such as the display mechanism 106. More specifically, for example, the operation reception unit 115 receives a schedule item outside the step operation period from the operator. Moreover, for example, the operation reception unit 115 receives, from the operator, a change or addition of schedule for step processing allocated by the schedule allocation unit 113.

Furthermore, the new schedule item according to the change or addition of a schedule item for step processing may sometimes partially or entirely overlap with the existing schedule item allocated by the schedule allocation unit 113. Thus, as a command for processing to be performed when the new schedule item and the existing schedule item overlap with each other, the operation reception unit 115 receives, from the operator, a command for prioritizing one of the new schedule item and the existing schedule item (referred to as "priority schedule command" hereinafter). The priority schedule command will be described in detail later.

For example, the warning output unit 116 as an example of output means outputs a warning by generating sound or by causing a display, such as the display mechanism 106, to display a message via the display controller 114. For example, in a case where a scheduled time point at which the step processing ends exceeds a preset deadline as a result of the schedule allocation unit 113 allocating the schedule for step processing, the warning output unit 116 outputs a warning. Moreover, for example, in a case where a scheduled time point at which generation of a printed material ends in a print job (i.e., a scheduled time point at which the dispatch step, which is the final step, ends) exceeds a deadline as a result of the schedule allocation unit 113 allocating the schedule for step processing, the warning output unit 116 outputs a warning.

The functional units constituting the print-process management apparatus 100 are realized by software and hardware operating in cooperation with each other. Specifically, for example, in a case where the print-process management apparatus 100 is realized in the hardware configuration shown in FIG. 1, the various types of programs stored in the HDD 104 are loaded into the RAM 103 and are executed by the CPU 101, so that the functional units, such as the operation-period registration unit 111, the schedule acquisition unit 112, the schedule allocation unit 113, the display controller 114, the operation reception unit 115, and the warning output unit 116 shown in FIG. 3, are realized.

Process for Registering Operation Period

Next, a process in which the operation-period registration unit 111 registers a step operation period will be described with reference to a specific example.

Figure 4:
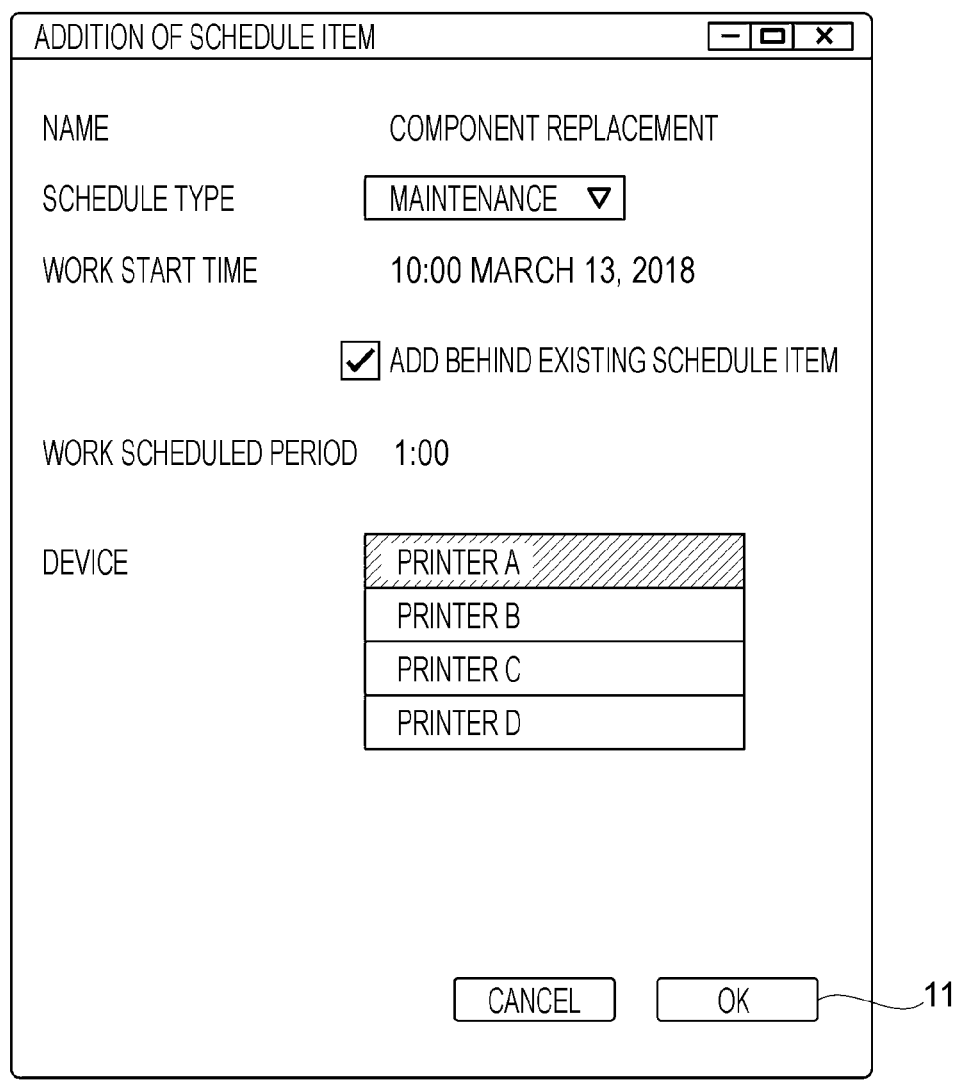
FIG. 4 illustrates an example of a screen that receives a schedule item outside a step operation period.

FIG. 4 illustrates an example of a screen that receives a schedule item outside the step operation period. The following description of this example relates to a case where a schedule item outside the operation period of a printing step, that is, a schedule item outside the operation period of the printer, is received.

A "name" indicates the name of a schedule item outside the operation period and is input by the operator. In the example shown in FIG. 4, "component replacement" is input. A "schedule type" indicates the type of schedule item outside the operation period and may be set by the operator by selecting a corresponding item from a pull-down menu. Although "maintenance" is selected in the example shown in FIG. 4, examples of items to be displayed include maintenance, operation stoppage, and recess (i.e., worker's recess) items. A "work start time" indicates the time and date for starting the schedule item outside the operation period, and a "work scheduled period" indicates a scheduled period outside the operation period. In the example shown in FIG. 4, the work is scheduled to be performed for one hour starting from 10:00 on Mar. 13, 2018.

A "device" indicates schedule-registerable printers. The operator may select a corresponding printer from printers displayed in this field. In this example, for example, the operator selects the printing step from the steps constituting the print process so that a list of printers is displayed in the "device" field. For example, in a case where the operator selects the post-processing step, a list of post-processing devices is displayed in the "device" field. Moreover, for example, in a case where the operator selects the inspection step or the dispatch step, the "device" field may be set in a non-displayed mode, or a list of inspection devices or transport devices may be displayed.

After the operator inputs each of the items and selects an "OK" button 11, a schedule item outside the operation period of the printing step is set. FIGS. 5A and 5B illustrate examples of schedule items outside the operation period of the printing step.

In the example shown in FIG. 5A, "maintenance" is set between 10:00 and 11:00 on Mar. 13, 2018 as a schedule item of a printer A as a result of the operator performing the input process as in FIG. 4. Furthermore, for example, as shown in FIG. 5B, schedule items of the printer A for Mar. 13, 2018 are registered as a result of the operator setting other schedule items outside the operation period. In the example shown in FIG. 5B, "operation stoppage" is set between 0:00 and 8:00, "maintenance" is set between 8:00 and 9:00, 13:00 and 14:00, and 18:00 and 19:00, and "recess" is set between 12:00 and 13:00. The operation-period registration unit 111 registers the periods from 9:00 to 12:00, 14:00 to 18:00, and 19:00 to 24:00 as the operation periods of the printer A.

Although the above example relates to a case where a schedule item outside the operation period of the printer A is set, the operator sets a schedule item outside the operation period for each of the plurality of steps constituting the print process.

Alternatively, the operator may set the operation period of each step instead of a schedule item outside the operation period of each step.

Process for Allocating Schedule Item to Operation Period

The following description relates to a specific example in which the schedule allocation unit 113 performs a process for allocating a schedule item to the step operation period. FIG. 6 illustrates an example in which schedule items are allocated to the step operation period. In this example, it is assumed that a schedule item for printing of each print job is allocated to the operation period on Mar. 13, 2018 of the printer A shown in FIG. 5B.

With regard to each print job based on which printing is to be performed by the printer A, the schedule acquisition unit 112 acquires a predicted scheduled period necessary for the printing. Moreover, the schedule acquisition unit 112 acquires a deadline for each print job. In this example, the printer A is scheduled to perform printing based on six print jobs, namely, job 1 to job 6, and the schedule acquisition unit 112 acquires the scheduled period and the deadline for each of the six print jobs 1 to 6.

Subsequently, the schedule allocation unit 113 allocates the schedule items for printing based on the six print jobs 1 to 6 to the operation period of the printer A. The allocation in this case is performed in accordance with a predetermined rule. For example, the schedule allocation unit 113 performs the allocation sequentially starting from the earliest deadline among the jobs 1 to 6. In this case, since job 1 has the earliest deadline, a schedule item is allocated such that the printing based on job 1 starts from 9:00. Subsequently, the schedule items for the remaining jobs 2 to 6 are allocated sequentially starting from the earliest deadline.

Furthermore, although the schedule allocation unit 113 allocates a schedule item for each print job to the operation period of the printer A in this example, the schedule allocation unit 113 also allocates schedule items for print jobs with regard to printers other than the printer A.

Moreover, in each of the print jobs 1 to 6, there are also steps following the printing step (i.e., the post-processing, inspection, and dispatch steps). Thus, similar to the printing step, the schedule allocation unit 113 allocates the schedule items for the six print jobs 1 to 6 to the operation period of each of the steps following the printing step.

Accordingly, the schedule allocation unit 113 allocates a schedule item of step processing to be executed in each of the steps constituting the print process to the operation period of each step.

Procedure of Allocation Process when Operator Changes or Adds Schedule Item

Figure 7:
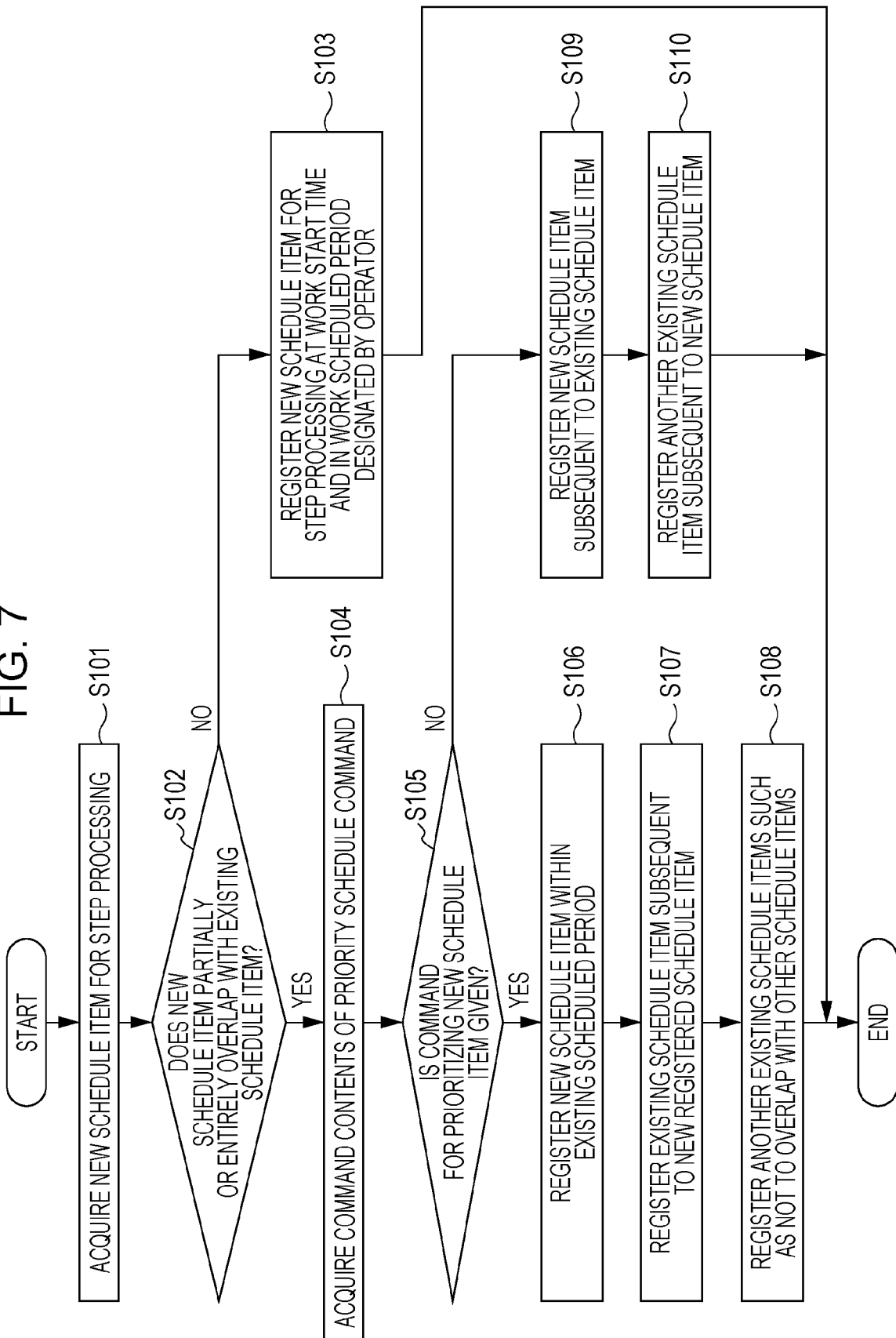
FIG. 7 is a flowchart illustrating an example of a procedure of an allocation process when an operator changes or adds a schedule item.

Next, a procedure of an allocation process in a case where the operator changes or adds a schedule item will be described. FIG. 7 is a flowchart illustrating an example of the procedure of the allocation process when the operator changes or adds a schedule item.

First, in step S101, the operator performs an operation for changing a schedule item of step processing or an operation for adding a schedule item of step processing, so that the schedule allocation unit 113 acquires a new schedule item of step processing. Then, in step S102, the schedule allocation unit 113 determines whether or not the new schedule item partially or entirely overlaps with an already-registered existing schedule item. The existing schedule item includes a schedule item outside the step operation period and an already-registered schedule item of step processing.

If a negative determination result (NO) is obtained in step S102, the schedule allocation unit 113 registers the new schedule item of step processing at a work start time and date and in a work scheduled period designated by the operator in step S103. Then, the flow of the process ends.

In contrast, if a positive determination result (YES) is obtained in step S102, the schedule allocation unit 113 acquires the command contents of a priority schedule command in step S104. Then, the schedule allocation unit 113 determines in step S105 whether or not there is a command for prioritizing the new schedule item in the priority schedule command.

If a positive determination result (YES) is obtained in step S105, the schedule allocation unit 113 prioritizes the new schedule item and registers the new schedule item within a period in which the existing schedule item is set in step S106. In other words, the schedule allocation unit 113 registers the new schedule item at a work start time and date and in a work scheduled period designated by the operator as a new schedule item. Then, in step S107, the schedule allocation unit 113 registers the existing schedule item, which overlaps with the new schedule item, subsequent to the new registered schedule item.

Subsequently, in step S108, the schedule allocation unit 113 registers another existing schedule item following the existing schedule item registered in step S107 such that such another existing schedule item does not overlap with other schedule items. In this case, the schedule allocation unit 113 registers such another existing schedule item sequentially behind other schedule items such that such another existing schedule item does not overlap with a schedule item allocated in front thereof.

If a negative determination result (NO) is obtained in step S105, the schedule allocation unit 113 prioritizes the existing schedule item and registers the new schedule item subsequent to the existing schedule item without shifting the existing schedule item in step S109. Then, in step S110, the schedule allocation unit 113 registers another existing schedule item, which is registered subsequent to the existing schedule item, subsequent to the new schedule item. In this case, the schedule allocation unit 113 registers such another existing schedule item sequentially behind other schedule items such that such another existing schedule item does not overlap with a schedule item allocated in front thereof. Then, the flow of the process ends.

Accordingly, in a case where a new schedule item partially or entirely overlaps with an existing schedule item, the schedule allocation unit 113 allocates one schedule item behind another schedule item to be prioritized based on a priority schedule command.

A schedule item outside the operation period may include a time-unchangeable schedule item and a time-changeable schedule item. For example, an operation stoppage schedule item is registered as a time-unchangeable schedule item. Furthermore, for example, with regard to maintenance of a printer, large-scale maintenance executed once per year is registered as a time-unchangeable schedule item, whereas small-scale maintenance executed once per day is registered as a time-changeable schedule item.

Therefore, in a case where other schedule items are sequentially shifted behind due to a new schedule item, for example, an operation stoppage schedule item or a large-scale maintenance schedule item is not changed, whereas a small-scale maintenance schedule item is changed. More specifically, for example, if a step-processing schedule item and an operation stoppage schedule item overlap with each other in accordance with another schedule item being sequentially shifted behind due to a new schedule item, the step processing schedule item is allocated subsequent to the operation stoppage schedule item. On the other hand, if a step processing schedule item and a small-scale maintenance schedule item overlap with each other, the small-scale maintenance schedule item is allocated subsequent to the step processing schedule item.

Furthermore, for example, a time unchangeable schedule item is sometimes registered subsequent to an existing schedule item overlapping with a new schedule item. If the existing schedule item is to be prioritized based on a priority schedule command, the new schedule item is allocated subsequent to the time-unchangeable schedule item.

Moreover, in this exemplary embodiment, there may be a plurality of new schedule items. In this case, for example, if the new schedule items are to be prioritized based on a priority schedule command, the schedule allocation unit 113 allocates the plurality of new schedule items and allocates an existing schedule item subsequent to the last-allocated new schedule item. Furthermore, for example, if an existing schedule item is to be prioritized based on a priority schedule command, the schedule allocation unit 113 sequentially allocates the plurality of new schedule items subsequent to the existing schedule item. Alternatively, the contents of a priority schedule command may be set for each new schedule item, and the order of the new schedule items and the existing schedule item may be set based on the set contents of the priority schedule command.

Example of Process Performed by Operator for Changing or Adding Schedule Item

The following description with reference to a specific example relates to an allocation process in a case where the operator changes or adds a schedule item of step processing.

FIGS. 8A to 10D illustrate examples of the allocation process in a case where the operator changes or adds a schedule item of step processing. Specifically, FIGS. 8A to 9D illustrate examples where the operator changes a schedule item, and FIGS. 10A to 10D illustrate an example where the operator adds a schedule item.

In the example shown in FIGS. 8A to 8C, registered schedule items of the printer A include maintenance between 10:00 and 11:00 outside the operation period and printing based on job 1 between 13:00 and 14:00, as in FIG. 8A.

FIG. 8B illustrates an example of a screen for receiving a change of a schedule item. In this case, it is assumed that the schedule item of printing based on job 1 is to be changed.

A "name" indicates the name of a print job to be changed, and is "job 1" in the example shown in FIG. 8B. A "work start time" indicates the start time and date after the change, and a "work scheduled period" indicates a scheduled period after the change. In the example shown in FIG. 8B, 11:00 on Mar. 13, 2018 is indicated as the start time and date after the change. The scheduled period is the same as that before the change and is one hour. A "device" indicates a device that is to execute step processing. In the example shown in FIG. 8B, a list of printers is displayed. Although there is no change from the printer A in this case, if the printer that is to execute print processing is to be changed, the operator may select a printer after the change from among the printers displayed in the list.

Then, after the operator sets each item and selects an "OK" button 12, the schedule item for job 1 is changed. As a result, as shown in FIG. 8C, the scheduled period for performing printing based on job 1 is changed from the period between 13:00 and 14:00 to the period between 11:00 and 12:00.

A checkbox 13 (see FIG. 8B) is used for making a priority schedule command. Specifically, if a new schedule item obtained as a result of changing or adding a schedule item for step processing partially or entirely overlaps with an existing schedule item, the command is executed for prioritizing the new schedule item or the existing schedule item. By using the checkbox 13, a priority schedule command is executed for every new schedule item. However, in the example shown in FIGS. 8A to 8C, the print schedule item for job 1, which is a new schedule item after the change, is 11:00 to 12:00 and thus does not overlap with an existing schedule item. Therefore, the existence or nonexistence of a checkmark in the checkbox 13 is not relevant.

Next, in the example shown in FIGS. 9A to 9C, registered schedule items of the printer A include maintenance between 11:00 and 12:00 outside the operation period and printing based on job 1 between 13:00 and 14:00, as in FIG. 9A. In a case where the operator changes the print schedule item for job 1 from the period between 13:00 and 14:00 to the period between 11:00 and 12:00 by performing a setting process as in the screen shown in FIG. 9B, the changed print schedule item overlaps with the maintenance schedule item between 11:00 and 12:00. In this case, it is determined whether to prioritize the print schedule item or the maintenance schedule item based on whether or not a checkmark exists in the checkbox 13.

If a checkmark is added to the checkbox 13 (i.e., if the checkbox 13 is in an ON state), the existing schedule item is prioritized over the new schedule item. Then, the new schedule item is allocated subsequent to the existing schedule item without shifting the existing schedule item. If a checkmark is not added to the checkbox 13 (i.e., if the checkbox 13 is in an OFF state), the new schedule item is prioritized over the existing schedule item. Then, the new schedule item is allocated within the period in which the existing schedule item is set, and the existing schedule item is allocated subsequent to the new schedule item.

Since a checkmark is added to the checkbox 13 in the screen shown in FIG. 9B, the maintenance schedule item, which is the existing schedule item, is prioritized over the print schedule item for job 1, which is the new schedule item. As a result, as shown in FIG. 9C, the print schedule item for job 1 is allocated subsequent to the maintenance schedule item, while the maintenance schedule item remains in the period between 11:00 and 12:00.

On the other hand, if a checkmark is not added to the checkbox 13, the print schedule item for job 1, which is the new schedule item, is prioritized over the maintenance schedule item, which is the existing schedule item. As a result, as shown in FIG. 9D, the print schedule item for job 1 is allocated to the period between 11:00 and 12:00 designated by the operator. Then, the maintenance schedule item is allocated subsequent to the print schedule item for job 1.

With regard to the checkmark in the checkbox 13, the checkmark may be added thereto in the default state (i.e., initial setting) or may be not added thereto in the default state.

Furthermore, in the example shown in FIGS. 9A to 9D, since the print schedule item for job 1 after the change is between 11:00 and 12:00 and the maintenance schedule item is between 11:00 and 12:00, the print schedule item for job 1 entirely overlaps with the maintenance schedule item. However, in this exemplary embodiment, for example, even if the print schedule item for job 1 after the change is between 11:30 and 12:30 and thus partially overlaps with the maintenance schedule item, the print schedule item for job 1 and the maintenance schedule item are allocated in accordance with the contents of the priority schedule command.

Next, in the example shown in FIGS. 10A to 10D, a maintenance schedule item is registered between 18:00 and 19:00 and an operation stoppage schedule item is registered between 0:00 and 8:00 as schedule items outside the operation period of the printer A, as in FIG. 10A. Moreover, a print schedule item for job 5 is registered between 19:00 and 21:00 and a print schedule item for job 6 is registered between 21:00 and 0:00 as schedule items of step processing of the printer A.

FIG. 10B illustrates an example of a screen for receiving an addition of a schedule item. The screen used here may be similar to the screen shown in FIG. 4.

A "name" indicates the name of a print job to be added, and is "job A" in the example shown in FIG. 10B. A "schedule type" indicates the type of step processing and may be set by the operator by selecting a corresponding item from a pull-down menu. An item to be displayed in this case is, for example, print.

A "work start time" indicates the time and date for starting the schedule item to be added, and a "work scheduled period" indicates the scheduled period of the schedule item to be added. In the example shown in FIG. 10B, the work is scheduled to be performed for one hour starting from 20:00 on Mar. 13, 2018. A "device" indicates a device that is to execute step processing. In the example shown in FIG. 10B, a list of printers is displayed. Although there is no change from the printer A in this case, if the printer that is to execute print processing is to be changed, the operator may select a printer after the change from among the printers displayed in the list.

The checkbox 13 is the same as the checkbox 13 shown in FIGS. 8B and 9B. In this example, a checkmark is not added to the checkbox 13.

After the operator sets each item and selects an "OK" button 11, a print schedule item for job A is added.

Although the added print schedule item for job A is between 20:00 and 21:00, the print schedule item for job 5 is already registered between 20:00 and 21:00. If the print schedule item for job A is added, the print schedule item for job A would overlap with the print schedule item for job 5. In this case, it is determined whether to prioritize the print schedule item for job A or the print schedule item for job 5 based on whether or not a checkmark exists.

Since a checkmark is not added to the checkbox 13 in this example, the print schedule item for job A, which is a new schedule item, is prioritized over the print schedule item for job 5, which is an existing schedule item. As a result, as shown in FIG. 10C, the print schedule item for job A is added between 20:00 and 21:00 designated by the operator. Then, the print schedule item for job 5 is allocated subsequent to the print schedule item for job A. As a result, the print schedule item for job 5 is registered between 21:00 and 23:00 and is thus delayed by two hours in the case of FIG. 10A.

Furthermore, the print schedule item for job 6, which is subsequent to the print schedule item for job 5, is also delayed by two hours. This causes the print schedule item for job 6 to be set between 23:00 and 2:00, but since the operation stoppage schedule item for the printer A is between 0:00 and 8:00, the print schedule item for job 6 and the operation stoppage schedule item would overlap with each other. The operation stoppage schedule item is registered as a time unchangeable schedule item, and the print schedule item for job 6 extends beyond the operation stoppage period, but the printing in this case is not completed within Mar. 13, 2018. In a case where the schedule item for step processing exceeds the preset deadline as in this case, a warning is output. In other words, the warning output unit 116 acquires a preset deadline for each step as a deadline for step processing, and outputs a warning if the schedule item for the step processing exceeds the preset deadline.

For example, a deadline for step processing is set in advance for each step by the operator. For example, the deadline for the print schedule item for job 6 is set in advance as "Mar. 13, 2018". Moreover, deadlines may be set in advance in units of steps. For example, for the printing step, "within current date" is set in advance as a deadline. In this case, the schedule item for print processing set by the operator is time-changeable if the set time is the same as the time at which the print processing is scheduled to finish at the "work start time" and within the "work scheduled period", but a warning is output if there is a change of time such that the print processing finishes on the next day or thereafter.

FIG. 10D illustrates an example of a warning output by the warning output unit 116. In the example shown in FIG. 10D, a message screen indicating that an existing schedule item exceeds a preset deadline as a result of an addition of a new schedule item is displayed as a warning. More specifically, the new schedule item is the print schedule item for job A, and the existing schedule item is the print schedule item for job 6. Moreover, the preset deadline is Mar. 13, 2018. If the operator selects a "NO" button 14 on the screen, the new schedule item is allocated, whereas the existing schedule item is not allocated, and the operation reception unit 115 becomes in a state where it accepts a change of schedule item. In contrast, if the operator selects a "YES" button 15 on the screen, the existing schedule item is allocated in a state where it exceeds the preset deadline.

More specifically, the schedule allocation unit 113 registers a print job to which a schedule item for step processing is not allocated as a non-allocated print job (referred to as "non-allocated job" hereinafter). A non-allocated job may be regarded as a print job to which a schedule item for partial or entire processing (i.e., step processing) related to generation of a printed material based on a print job is not allocated. In the example shown in FIGS. 10C and 10D, the operator selects the "NO" button 14 so that job 6 corresponding to the existing schedule item becomes a non-allocated job. Because job 6 is non-allocated in the printing step, the registered schedule item is also deleted for each of the post-processing, inspection, and dispatch steps following the printing step, whereby job 6 becomes non-allocated.

FIG. 11 illustrates an example of non-allocated jobs. Jobs 6, 10, 11, 12, and 13 are registered as non-allocated jobs. These print jobs do not have schedule items for print processing allocated thereto. A "status" indicates, for example, a cause for not having a schedule item allocated to a print job. For example, since job 6 does not have a print schedule item allocated thereto due to an addition of job A, "addition of job A" is indicated as the status.

Furthermore, although non-allocated jobs in the printing step are shown in the example in FIG. 11, non-allocated jobs in the post-processing, inspection, and dispatch steps are similarly registered.

The display controller 114 displays information about a list of non-allocated jobs. The display controller 114 may display a list of non-allocated jobs for each step or may display non-allocated jobs for all steps in the form of a list.

The operator may check such a list of non-allocated jobs and adjust the schedule.

Figure 12A:
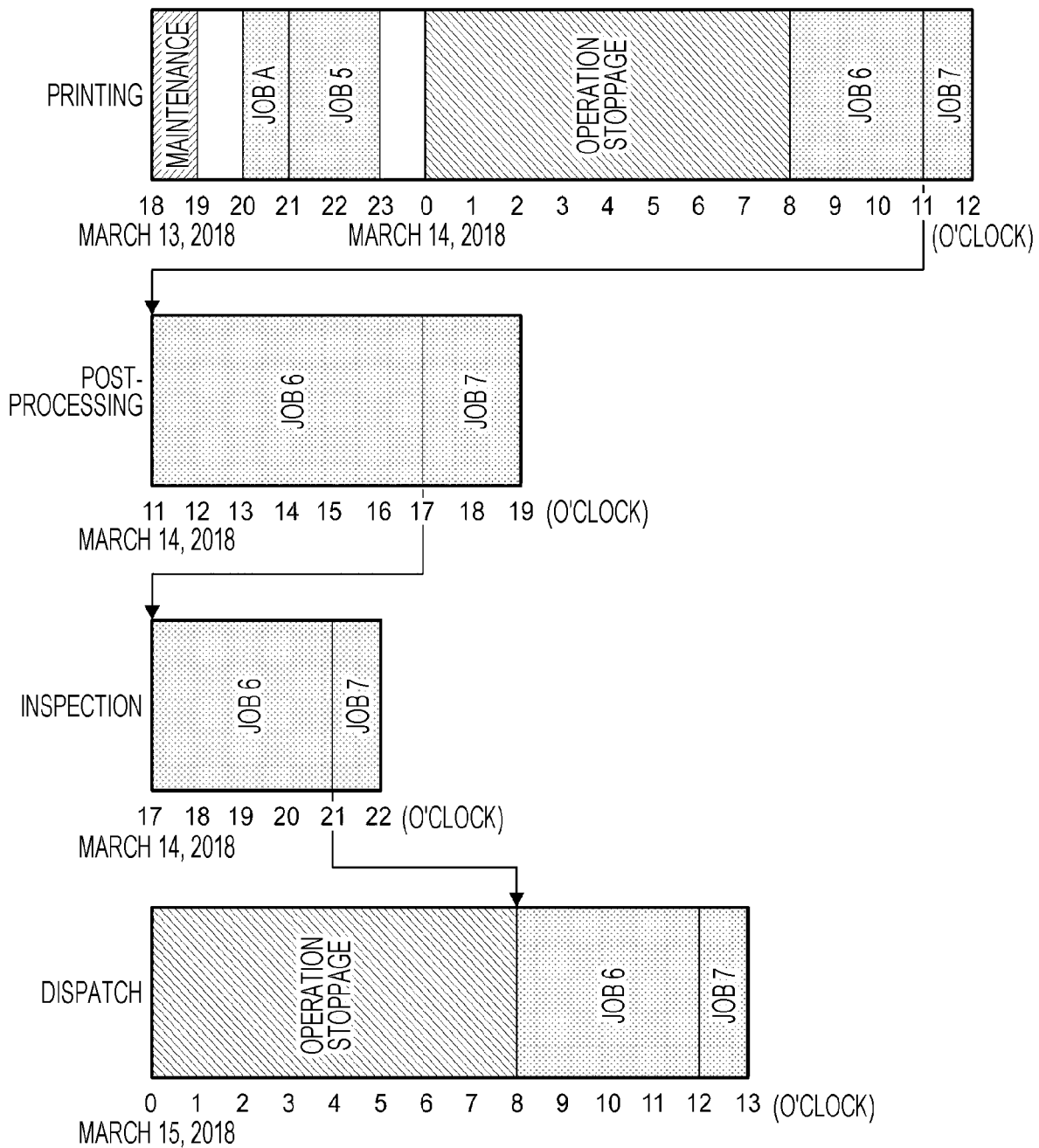
FIGS. 12A and 12B illustrate an example where an existing schedule item is registered in a state where the existing schedule item exceeds a preset deadline due to an addition of a new schedule item.
Figure 12B:
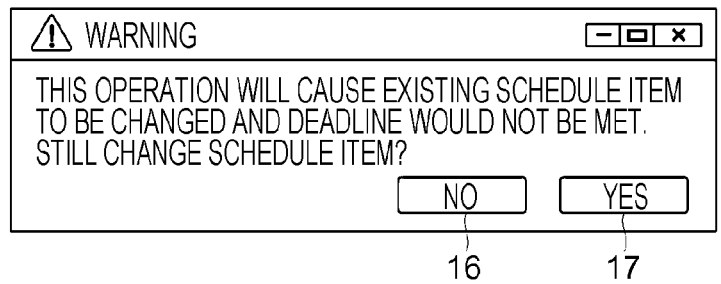

The following description relates to a case where the operator selects the "YES" button 15 on the message screen shown in FIG. 10D so as to register the print schedule item for job 6, which is an existing schedule item, in a state where the print schedule item for job 6 exceeds the preset deadline. FIGS. 12A and 12B illustrate an example where an existing schedule item is registered in a state where the existing schedule item exceeds a preset deadline due to an addition of a new schedule item.

Because the print schedule item for job 6 extends for three hours and the operation is scheduled to stop between 0:00 and 8:00 on Mar. 14, 2018, the print schedule item for job 6 would be between 8:00 and 11:00. Although a print schedule item for job 7 is registered between 8:00 and 9:00, the print schedule item for job 7 is registered between 11:00 and 12:00 since the print schedule item for job 6 is registered between 8:00 and 11:00.

Furthermore, a post-processing schedule item for job 6 extends between, for example, 8:00 and 14:00 before job A is added, but is changed to 11:00 to 17:00 since the end time point of the print schedule item for job 6 becomes 11:00. Moreover, a post-processing schedule item for job 7 is allocated subsequent to the post-processing schedule item for job 6 and is thus changed to 17:00 to 19:00. Accordingly, the print schedule items for jobs 6 and 7 are changed, so that the post-processing schedule items for jobs 6 and 7 are also changed.

Furthermore, an inspection schedule item for job 6 extends between, for example, 14:00 and 18:00 before job A is added, but is changed to 17:00 to 21:00 since the end time point of the post-processing schedule item for job 6 becomes 17:00. Moreover, an inspection schedule item for job 7 is allocated subsequent to the inspection schedule item for job 6 and thus becomes 21:00 to 22:00.

A dispatch schedule item for job 6 extends between, for example, 18:00 and 22:00 before job A is added, but is changed to 21:00 to 1:00 since the end time point of the inspection schedule item for job 6 becomes 21:00. However, since dispatch processing is scheduled to stop between 0:00 and 8:00, the dispatch schedule item for job 6 and the operation stoppage schedule item overlap with each other. Thus, the dispatch schedule item for job 6 is changed to 8:00 to 12:00 on the following day (i.e., Mar. 15, 2018), so as to start upon the end of the operation stoppage period. A dispatch schedule item for job 7 is allocated subsequent to the dispatch schedule item for job 6 and is thus changed to 12:00 to 13:00.

Accordingly, when the print schedule item for job A is added, the schedule allocation unit 113 not only changes the schedule item of the operation period of the printer A but also changes the schedule items for the post-processing, inspection, and dispatch steps.

If the deadline for job 6 is Mar. 14, 2018, job 6 would not meet the deadline. Moreover, for example, even if job 6 meets the deadline, it is conceivable that job 7 would not meet its deadline. In a case where a scheduled time point at which generation of a printed material ends in a print job (i.e., a scheduled time point at which the dispatch step, which is the final step, ends) exceeds a deadline in this manner, a warning is output. In other words, the warning output unit 116 acquires a preset deadline as a deadline for the generation of the printed material based on the print job, and outputs a warning if the scheduled time point at which the generation of the printed material ends in the print job exceeds the deadline.

FIG. 12B illustrates an example of a warning output by the warning output unit 116. In the example shown in FIG. 12B, a message screen indicating that an existing schedule item exceeds a preset deadline as a result of an addition of a new schedule item is displayed as a warning. Specifically, the new schedule item is a schedule item for job A and the existing schedule item is either one of a schedule item for job 6 and a schedule item for job 7. When the operator selects a "NO" button 16 on the screen, the new schedule item is allocated, whereas the existing schedule item is not allocated, and the operation reception unit 115 becomes in a state where it accepts a change of schedule item. If the operator selects a "YES" button 17 on the screen, the existing schedule item is allocated in a state where it exceeds the preset deadline.

In other words, in contrast to the above example in which the warning output unit 116 outputs a warning in FIG. 10D when a schedule item for step processing exceeds a preset deadline, the warning in FIG. 10D does not have to be output if the deadline may be ultimately met.

For example, if printing based on a print job is scheduled on the following day, the schedule allocation unit 113 determines whether or not the printing to be performed based on the print job would ultimately meet the deadline. Then, if the scheduled end time point of dispatch would ultimately meet the deadline, the schedule allocation unit 113 actually changes the schedule items for the individual steps and allocates the schedule items, regardless of an operation of the operator. Then, the warning output unit 116 does not output the warning in FIG. 10D or the warning in FIG. 12B. On the other hand, if the deadline would not be ultimately met, the warning output unit 116 outputs the warning in FIG. 10D and the warning in FIG. 12B. Alternatively, only one of the warning in FIG. 10D and the warning in FIG. 12B may be output, or the contents of the two warnings may be output as a single warning.

Likewise, in the above example, in a case where a schedule item for step processing exceeds a preset deadline, when the operator selects the "NO" button 14 (see FIG. 10D), the schedule allocation unit 113 registers a print job in which the schedule item for step processing exceeds the preset deadline as a non-allocated job. If the schedule item would ultimately meet the deadline, the print job does not have to be registered as a non-allocated job.

For example, if printing based on a print job is scheduled on the following day, the schedule allocation unit 113 determines whether or not the printing to be performed based on the print job would ultimately meet the deadline. Then, if the scheduled end time point of dispatch would ultimately meet the deadline, the schedule allocation unit 113 actually changes the schedule items for the individual steps and allocates the schedule items, regardless of an operation of the operator. In this case, the print job is not registered as a non-allocated job. On the other hand, in a case where the printing would not ultimately meet the deadline, the print job is not registered as a non-allocated job when the operator makes a selection to allocate the schedule item exceeding the deadline, but is registered as a non-allocated job when the operator makes a selection to not allocate the schedule item exceeding the deadline.

In the example shown in FIG. 10D, the print schedule item for job 6 is not completed within Mar. 13, 2018 and exceeds the preset deadline, so that the warning output unit 116 outputs a warning. For example, the warning output unit 116 may output a warning based on a condition in which the print schedule item for job 6 overlaps with the operation stoppage schedule item. In other words, the operation stoppage schedule item is an example of a specific time-unchangeable schedule item. Specifically, the warning output unit 116 may output a warning if a schedule item for step processing overlaps with a specific time-unchangeable schedule item as a result of allocation of the schedule item for step processing by the schedule allocation unit 113.

Furthermore, a non-allocated job is not limited to a print job in which the step processing exceeds a deadline or to a print job in which the scheduled end time point of dispatch exceeds a deadline. For example, a print job in which it is not yet determined whether the print process is to be actually performed or a print job in which the timing for performing the print process is not set may be registered as a non-allocated job.

Moreover, in the example shown in FIG. 10D, if the operator selects the "NO" button 14, an addition of job A, which is the cause of the existing schedule item not meeting the preset deadline, may be not allowed. In this case, similar to the above description, when the operator selects the "YES" button 15, the schedule items for jobs 6 and 7 are allocated such as to exceed the preset deadlines set for jobs 6 and 7.

Likewise, in the example shown in FIG. 12B, if the operator selects the "NO" button 16, an addition of job A may be not allowed. In this case, similar to the above description, when the operator selects the "YES" button 17, the schedule items for jobs 6 and 7 are allocated such as to exceed the ultimate deadlines.

As described above, the print-process management apparatus 100 according to this exemplary embodiment allocates a schedule item for step processing to the operation period of a process for generating a printed material. Then, if a new schedule item partially or entirely overlaps with an existing schedule item due to a change of or an addition to the allocated schedule item, the schedule allocation unit 113 of the print-process management apparatus 100 allocates the new schedule item and the existing schedule item in accordance with the contents of a priority schedule command.

In this exemplary embodiment, it is conceivable that a new schedule item obtained as a result of a change or addition by the operator may overlap with a time-unchangeable schedule item. With reference to an operation stoppage schedule item as an example of a time-unchangeable schedule item, for example, if a new schedule item is to be prioritized in a priority schedule command, the new schedule item is allocated within the operation stoppage period, and the operation stoppage schedule item is allocated subsequent to the new schedule item. However, even if a new schedule item is to be prioritized in a priority schedule command, the operation stoppage period may be prioritized such that the new schedule item is allocated subsequent to the operation stoppage period, a warning may be output without allocating the new schedule item, or the print job corresponding to the new schedule item may be registered as a non-allocated job.

Furthermore, in the above example, a priority schedule command is executed by using the checkbox 13. Alternatively, the method for executing the priority schedule command is not limited to this. For example, a button used for prioritizing a new schedule item and a button used for prioritizing an existing schedule item may be provided on the screen. Moreover, for example, assuming that a new schedule item is to be prioritized in a default state, the operator may perform an operation for prioritizing an existing schedule item so as to prioritize the existing schedule item.

Furthermore, in this exemplary embodiment, the processing performed in the print-process management apparatus 100 may be shared with another apparatus instead of being performed in a single print-process management apparatus 100. Moreover, the processing performed in the print-process management apparatus 100 may be performed by a printed-material generating device, such as a printer or a post-processing device.

Configuration Example of Print-Process Management System

Figure 13:
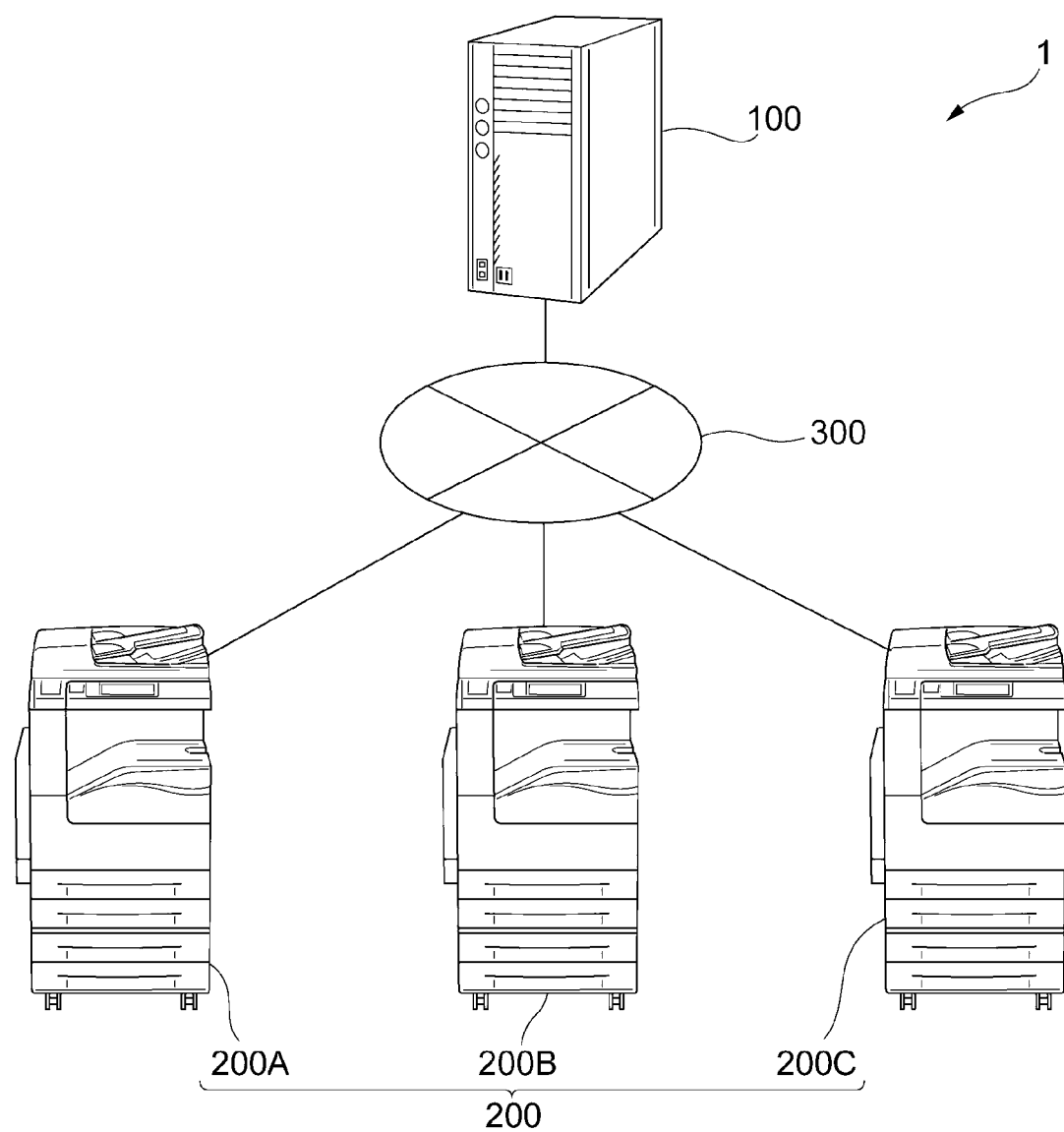
FIG. 13 illustrates a configuration example of a print-process management system according to an exemplary embodiment.

In this exemplary embodiment, the print-process management apparatus 100 and a printed-material generating device may be connected, and the printed-material generating device may perform processing related to generation of a printed material based on information acquired from the print-process management apparatus 100. FIG. 13 illustrates a configuration example of a print-process management system 1 according to this exemplary embodiment. As shown in FIG. 13, the print-process management system 1 is constituted by connecting the print-process management apparatus 100 and printed-material generating devices 200 via a network 300. As mentioned above, the printed-material generating devices 200 include, for example, a printer and a post-processing device. In this exemplary embodiment, the print-process management system 1 is an example of a print management system.

For example, in a case where a printed-material generating device 200A is a printer, the print-process management apparatus 100 transmits, to the printed-material generating device 200A, a print job based on which printing is to be performed by the printed-material generating device 200A. Then, the print-process management apparatus 100 executes a print command for the print job to the printed-material generating device 200A in accordance with a schedule item allocated to the operation period of the printed-material generating device 200A by the schedule allocation unit 113. For example, if printing based on job 1 is scheduled at 9:00 on Mar. 13, 2018 in the operation period of the printed-material generating device 200A, the print-process management apparatus 100 executes a print command for job 1 at 9:00 on Mar. 13, 2018. In accordance with this print command, the printed-material generating device 200A executes print processing based on job 1.

Furthermore, for example, in a case where a printed-material generating device 200B is a post-processing device, the print-process management apparatus 100 executes a post-processing command for a print job to the printed-material generating device 200B in accordance with a schedule item allocated to the operation period of the printed-material generating device 200B by the schedule allocation unit 113.

Accordingly, in the print-process management system 1 shown in FIG. 13, the print-process management apparatus 100 commands a printed-material generating device 200 to perform processing related to generation of a printed material. Then, the printed-material generating devices 200 performs processing related to generation of a printed material in accordance with a schedule item allocated by the schedule allocation unit 113.

For example, in the inspection step, the print-process management apparatus 100 provides, to a portable terminal of an inspector, for example, a notification about the completion of post-processing when the post-processing step is completed, or a notification about the start of inspection before a scheduled start time point for the inspection step. Likewise, in the dispatch step, the print-process management apparatus 100 provides, to the portable terminal of the inspector, for example, a notification about the completion of inspection when the inspection step is completed, or provides a notification about the start of dispatch before a scheduled start time point for the dispatch step.

A program that realizes the exemplary embodiment of the present disclosure may be provided via communication means or may be provided by being stored in a storage medium, such as a compact disc read-only memory (CD-ROM).

Although various exemplary embodiments and modifications have been described above, these exemplary embodiments and modifications may be combined with each other.

Furthermore, the present disclosure is not limited to the above exemplary embodiments, and various exemplary embodiments are permissible within the scope of the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A print management apparatus comprising:
    a memory, storing a program; and
    a processor, by executing the program to be configured to:
    allocate a schedule item for processing related to generation of a printed material to an operation period of a process for generating the printed material based on print information;
    receive a change of the allocated schedule item from an operator or receive an addition of a schedule item for processing related to the generation of the printed material from the operator; and
    receive a command for prioritizing one of a new schedule item obtained as a result of the change or the addition and an existing schedule item as a command for processing to be performed when the new schedule item partially or entirely overlaps with the existing schedule item.

2. The print management apparatus according to claim 1, wherein the processor is configured to allocate another schedule item subsequent to the one of the schedule items to be prioritized based on the command.

3. The print management apparatus according to claim 2, wherein, in a case where the command indicates that the existing schedule item is to be prioritized, the processor is configured to allocate the new schedule item subsequent to the existing schedule item without shifting the existing schedule item.

4. The print management apparatus according to claim 2, wherein, in a case where the command indicates that the new schedule item is to be prioritized, the processor is configured to allocate the new schedule item within a period in which the existing schedule item is set and allocate the existing schedule item subsequent to the new schedule item.

5. The print management apparatus according to claim 1, further comprising:
a display that displays a list of print information to which the schedule item for the processing related to the generation of the printed material based on the print information is not allocated by the processor.

6. The print management apparatus according to claim 5, wherein the print information to which the schedule item is not allocated has a scheduled time point at which the processing related to the generation of the printed material ends, the scheduled time point exceeding a preset deadline as a deadline for the processing.

7. The print management apparatus according to claim 5, wherein the process for generating the printed material includes a plurality of steps that are sequentially executed,
wherein the processor is configured to allocate the schedule item for the processing related to the generation of the printed material for each of the plurality of steps with regard to the print information, and
wherein the print information to which the schedule item is not allocated has a scheduled time point at which the processing related to the generation of the printed material ends in a final step of the plurality of steps, the scheduled time point exceeding a preset deadline as a deadline for the generation of the printed material based on the print information.

8. The print management apparatus according to claim 7, wherein the print information includes a plurality of pieces of print information grouped into one, and
wherein the deadline for the generation of the printed material based on the print information including the plurality of pieces of print information grouped into one is an earliest deadline of deadlines for the plurality of pieces of print information.

9. The print management apparatus according to claim 1, wherein the processor is configured to receive the command for every new schedule item.

10. A print management system comprising:
a print management apparatus including:
a memory, storing a program;
a processor, by executing the program to be configured to:
allocate a schedule item for processing related to generation of a printed material to an operation period of a process for generating the printed material based on print information,
receive a change of the allocated schedule item from an operator or receive an addition of a schedule item for processing related to the generation of the printed material from the operator, and
receive a command for prioritizing one of a new schedule item obtained as a result of the change or the addition and an existing schedule item as a command for processing to be performed when the new schedule item partially or entirely overlaps with the existing schedule item; and
a printed-material generating device that performs the processing related to the generation of the printed material in accordance with the schedule item allocated by the processor of the print management apparatus.

11. The print management system according to claim 10, wherein the printed-material generating device is a device that performs print processing based on the print information or a device that performs post-processing of the print processing.

12. A non-transitory computer readable medium storing a program causing a computer to execute a process, the process comprising:
allocating a schedule item for processing related to generation of a printed material to an operation period of a process for generating the printed material based on print information;
receiving a change of the allocated schedule item from an operator or receiving an addition of a schedule item for processing related to the generation of the printed material from the operator; and
receiving a command for prioritizing one of a new schedule item obtained as a result of the change or the addition and an existing schedule item as a command for processing to be performed when the new schedule item partially or entirely overlaps with the existing schedule item.

13. A print management apparatus comprising:
a memory, storing a program; and
a processor, by executing the program to be configured to:
allocate a schedule item for processing related to generation of a printed material to an operation period of a process for generating the printed material based on print information;
receive a change of the allocated schedule item from an operator or receive an addition of a schedule item for processing related to the generation of the printed material from the operator; and
receive a command for prioritizing one of a new schedule item obtained as a result of the change or the addition and an existing schedule item as a command for processing to be performed when the new schedule item partially or entirely overlaps with the existing schedule item
wherein the processor is configured to allocate another schedule item subsequent to the one of the schedule items to be prioritized based on the command, and
the processor is configured to allocate another existing schedule item behind the existing schedule item such that the another existing schedule item does not overlap with a schedule item allocated in front of the another existing schedule item.

14. The print management apparatus according to claim 13,
wherein a specific schedule item that is not time-changeable exists as a schedule item outside the operation period, and
wherein the processor is further configured to output a warning in a case where the schedule item for the processing related to the generation of the printed material overlaps with the specific schedule item due to the allocation performed by the processor.

15. The print management apparatus according to claim 13, wherein the processor is further configured to:
acquire a deadline for the processing related to the generation of the printed material and output a warning in a case where a scheduled time point at which the processing ends exceeds the deadline due to the allocation performed by the processor.

16. The print management apparatus according to claim 13,
- wherein the process for generating the printed material includes a plurality of steps that are sequentially executed,
- wherein the processor is configured to allocate the schedule item for the processing related to the generation of the printed material for each of the plurality of steps with regard to the print information, and
- wherein the processor is further configured to acquire a deadline for the generation of the printed material based on the print information and output a warning in a case where a scheduled time point at which the processing related to the generation of the printed material ends in a final step of the plurality of steps exceeds the deadline due to the allocation performed by the processor.

* * * * *